Feb. 20, 1962    H. OSTROFF ETAL    3,021,615
DEVICE FOR ASSESSING DAMAGE TO AUTOMOTIVE VEHICLES
Filed Nov. 3, 1959    2 Sheets-Sheet 1
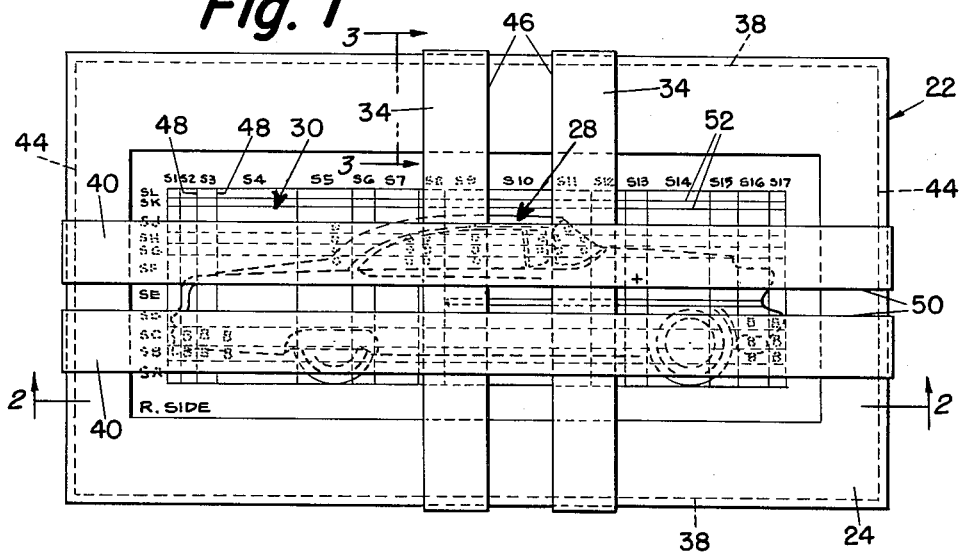
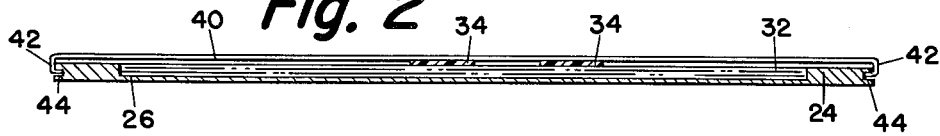
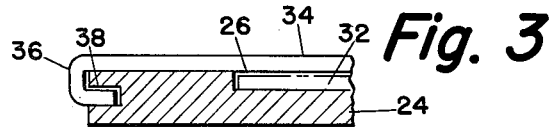
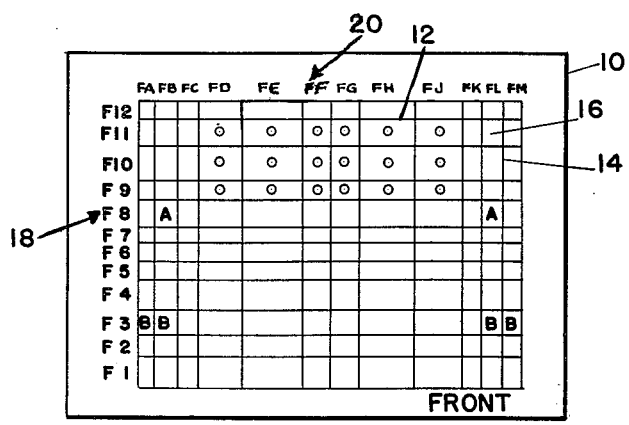
INVENTORS
HARRY OSTROFF
LOUIS H. LEVITT
BY
Max R. Millman
ATTORNEY Feb. 20, 1962     H. OSTROFF ET AL     3,021,615
DEVICE FOR ASSESSING DAMAGE TO AUTOMOTIVE VEHICLES
Filed Nov. 3, 1959     2 Sheets-Sheet 2

Fig. 5

LEFT AND RIGHT VIEWS    54

LOCATE FRONT BUMPER AGAINST OUTSIDE LINE. LOCATE BOTTOM OF INFLATED TIRES ON BOTTOM LINE. WHERE ABOVE LOCATIONS ARE IMPOSSIBLE, LOCATE TOP OF ROCKER PANEL ON LINE "Z" AND FRONT OF FRONT DOOR ON LINE "Y".

| LOCATION | EACH AREA | TOTAL |
|---|---|---|
| S1A TO S1L1 | $20.00 | $20.00 |
| S2A TO S2L3 | 15.00 | 30.00 |
| S2A TO S2LB1 | 20.00 | 20.00 |
| S2A TO S2LA1 | 10.00 | 10.00 |
| S3A TO S3L3 | 10.00 | 30.00 |
| S3A TO S3LB1 | 20.00 | |
| S3A TO S3LA1 | 10.0-- | |
| S4A TO S4--- | | |
| ... TO S17L | | 20.00 |
| | | 5.00 |
| S17A TO S17LB1 | 20.00 | 20.00 |
| S17A TO S17L41 | 10.00 | 10.00 |

TOTAL POSSIBLE DAMAGE ON LEFT OR RIGHT SIDE    $215.00 — 62

Fig. 6

KEY MULTIPLIERS   64   68

| BUICK | 40-60 1954 | = 1.842 |
| | 50-70 1954 | = 1.954 |
| 66— | 40-60 1953 | = 1.730 |
| | 50-70 1953 | = 1.882 |
| | 40-60 1952 | = 1.731 |
| | 50-70 1952 | = 1.896 |
| | 40-60 1951 | = 1.736 |
| | 50-70 1951 | = 1.864 |
| | 40-60 1950 | = 1.843 |
| | 50-70 1950 | = 1.923 |
| | 40-60 1949 | = 1.668 |
| | 50-70 1949 | = 1.884 |
| CADILLAC | 1954 | = 2.543 |
| FLEETWOOD | 1954 | = 2.603 |
| CADILLAC | 1953 | = 2.47- |

| | ..51 | = 1.392 |
| | 1950 | = 1.463 |
| | 1949 | = 1.487 |
| WILLYS | ALL | = 1.260 |

INVENTORS
HARRY OSTROFF
LOUIS H. LEVITT
BY
*Max R. Millman*
ATTORNEYS

United States Patent Office 3,021,615
Patented Feb. 20, 1962

3,021,615
DEVICE FOR ASSESSING DAMAGE TO AUTOMOTIVE VEHICLES
Harry Ostroff and Louis H. Levitt, Philadelphia, Pa., assignors to Collidotronics, Inc., Cheltenham, Pa., a corporation of Pennsylvania
Filed Nov. 3, 1959, Ser. No. 850,723
7 Claims. (Cl. 35—24)

This invention relates to a method and device for the quick, reliable and objective assessment of damage to automotive vehicles.

Heretofore, the extent and cost of damage to an automotive vehicle was determined by the detailed physical inspection of the vehicle on the part of adjusters, shop foremen and others skilled in this art. Not only is this inspection time-consuming, but often it is also inaccurate because it is too subjective. The present invention, on the other hand, is objective, obviates the necessity of a detailed internal examination of the vehicle and eliminates the need for expert assessors.

The present invention accomplishes these objectives by the combined use of a viewing device, photographs or other representations of the damaged vehicle and various charts. The device retains photographs of the front, rear, sides and roof of the damaged vehicle, upon which photographs are superimposed a gridwork of lines and code legends at the margins. The device includes means to scan the photograph and locate each area of damage by code designation. Employing a chart which lists the code areas by dollar damage value based on a predetermined standard vehicle of particular year, make and model, the tentative dollar damage value of each location of the viewed vehicle is listed. Using a key multiplier chart in which the values of various vehicles of different years, makes and models are related to the standard vehicle of the first chart, a multiplication factor is extracted for the viewed vehicle and the total damage is thereby obtained. The dollar damage value of each location in the first chart takes into consideration damage in depth in certain critical areas.

The invention therefore provides a device and method of assessing damage to automotive vehicles which is uniform, minimizes subjective inspection errors, standardizes costs of repair, and provides a permanent recordation of actual damage. It also reduces costs of adjustment, damage appraisal, litigation and rates of insurance. Moreover, it is an aid in accident reporting for safety councils and enforcement agencies as well as an aid in insurance actuarial computations. It protects insurers against inflated claims and the public against excessive costs of repair.

These and other objects of the invention will become more apparent as the following description proceeds in conjunction with the accompanying drawing wherein:

FIGURE 1 is a plan view of the scanning and viewing device shown in use to locate damage to one side of a vehicle;

FIGURE 2 is a sectional view taken on the line 2—2 of FIGURE 1;

FIGURE 3 is an enlarged sectional view taken on the line 3—3 of FIGURE 1;

FIGURE 4 is a plan view of a sheet representing code area designations of the front of a vehicle;

FIGURE 5 is a broken away face view of a dollar damage value chart for a standard vehicle; and FIGURE 6 is a view similar to FIGURE 5 of a key multiplier chart.

Specific reference is now made to the drawings wherein similar reference characters are used for corresponding elements throughout.

Attention is first called to FIGURE 4 which illustrates one of four code area sheets. Sheet 10 in FIGURE 4 is used for locating damage to the front of a vehicle, and is preferably transparent. It contains (by imprinting or scoring) a gridwork of intersecting horizontal and vertical lines 12 and 14 in certain predetermined locations dividing the entire front view of the vehicle into rectangular areas 16. Along one vertical margin are legends 18 in the form of codes identifying longitudinal areas of the front view of the vehicle from bottom to top thereof. Along one horizontal margin of the gridwork are legends 20 in the form of codes identifying vertical areas from the top to the bottom of the vehicle and along the entire front thereof.

It will be understood that four sheets like that of numeral 10 will be used, one to divide the roof view of the vehicle into code areas, another to divide the rear view of the vehicle into code areas and one to divide the side view (right and left interchangeably) of the vehicle into code areas, an example of the latter being illustrated in FIGURE 1. Of course, the gridwork arrangement and code legends differ from sheet to sheet.

It is to be noted that certain rectangular areas in the gridwork include legends such as O, A, B and +. The legend O indicates glass and if damage is located in the areas bearing the legend O, it is manifest that the glass must be entirely replaced. The areas marked A refer to the forward extensions of the fenders over the headlights and exist in American automobiles in years of 1954 and after. Injuries noted in the areas marked with A mean that the entire fender must be replaced. The legend B indicates bumper, and here again, detectable damage in the areas marked with the legend B indicates that the entire bumper must be replaced. The areas bearing the legend + indicate danger locations where internal damage usually occurs.

Photographs are taken of the front, rear, roof and sides of the damaged vehicle and are used together with the corresponding grid sheets 10 in the scanning and viewing device 22 which includes a substantially rectangular base member 24, made of wood, plastic or the like materials having a rectangular recess 26 dimensioned to receive each of photographic views of the damaged vehicle. If desired, the photograph may be first positioned in the recess and over it placed the transparent grid sheet 10 corresponding to the view of the automobile (i.e., front, rear, side or roof) in the photograph. Preferably, each photograph is so developed and printed that it contains super-imposed thereon as part of the photograph the gridwork of the sheet corresponding to the view of the vehicle in the photograph. Thus, during the printing of the photograph, light may be passed through a gridwork sheet and a negative of the view and then onto positive paper which is later developed. Other known photographic techniques may be used. A photograph 28 of the right side of a damaged vehicle having an appropriate gridwork 30 imprinted thereon is shown as a unit 32 which is positioned in the recess 26 of the base member 24.

Extending transversely across the base member and over the photograph-gridwork unit 32 is a pair of parallel strips 34 of opaque material, preferably plastic, the ends of which are curved around the longitudinal edges of the base member, as at 36, and slidably received in longitudinal slots 38. Similarly, a pair of parallel strips 40 extend longitudinally across the base member over the transverse strips 34, the ends of the longitudinal strips 40 being bent around the transverse edges of the base member as at 42 and being slidably received in slots 44. Thus, the strips 34 can be moved lengthwise of the base member and the strips 40 widthwise.

To scan the photographs 28 in relation to the code areas in the gridwork 30, the transverse strips 34 are moved lengthwise so that the facing edges 46 thereof coincide with a pair of adjacent vertical grid lines 48. The longitudinal strips 40 are moved transversely so that the facing edges 50 thereof coincide with a pair of adjacent horizontal grid lines 52. Thus, by moving the strips across the base member, one can frame each code area and view the photograph 28 of the damaged vehicle in said framed area. The person viewing them records the damage observed by those code letters and numbers in which the areas of damage are located.

A chart 54 is provided for each of the views, such as front, rear, top and sides, the same chart being used for both the right and the left side views. While FIGURE 5 shows a chart for left and right side views only, it will be understood that the charts for the front, rear and top views will have legends thereon which are arranged in a similar manner.

On the left hand side of the chart under the heading "Location" is a list of locations by code legends 56 corresponding to the code legends at the margins of the transparent sheets shown in FIGURES 1 and 4. The legends 56 on the charts 54 referring to the left and right side views will be the same as the legends on the margins of the transparent sheet which is used to examine the side views of the vehicle. The legends 56 on the charts 54 referring to the front view will be the same as the legends at the margins of the sheet which is used to examine the front view of the vehicle, and so forth for the rear view and for the top view.

On the chart 54 to the right of the column entitled "Location" is another column entitled "Each Area" beneath which is listed the dollar value 58 of the damage corresponding to the various code locations. These dollar damage values are predetermined and are based upon an arbitrarily chosen standard vehicle such, for example, as a 1950, 4-door Chevrolet.

On the chart 54 to the right of the column entitled "Each Area" is another column entitled "Total." This is normally a blank column and entries are made therein on the basis of the code areas of damage as viewed and recorded using the scanner of FIGURES 1–3. The assessor knowing the damaged areas by code legends and knowing the damage value for each of the areas then records the damage values 60 in the appropriate blank spaces in the column entitled "Total." Thus, an actual record is made on each of the charts 54 referring to the various views of the automotive vehicles, but these damage values are solely in terms of the standard vehicle upon which the chart is based. The total damage value is recorded at the bottom of the charts as at 62.

A further chart 64 is provided which is entitled "Key Multipliers" as shown in FIGURE 6. At the left hand side of this chart is a series of automotive vehicles identified by make, model and year as shown at 66. On the right hand side of the chart is a series of factors 68 corresponding to each entry for the various vehicles identified by make, model and year. These factors are predetermined from experience and represent the value of the entries of the various vehicles on the chart 64 relative to the value of the standard vehicle which was used to determine the damage value of each area in the chart 54.

The final assessment is made by totalling the damage entries on all of the charts 54 and then multiplying the total by the Key Multiplier 68 as ascertained from the chart 64.

While a preferred embodiment of the present method and means for assessing damage to automotive vehicles has been shown and described hereabove, it will be understood that skilled artisans may make minor variations without departing from the spirit of the invention and the scope of the appended claims. Thus, reproductions of a damaged vehicle other than a photograph may be employed.

We claim:

1. An auto damage assessment device comprising photographic views of the front, rear, sides and top of a damaged vehicle, gridworks of intersecting horizontal and vertical lines with code designations along the coordinates thereof, each gridwork being superimposed on each photograph and having code areas specially arranged for each photographic view, a base having a recess receiving one of said photographs, a pair of opaque transversely extending strips and a pair of opaque longitudinally extending strips slidably mounted on said base over said photograph, the inner edges of said strips being adapted to align with the horizontal and vertical lines of said gridwork to isolate each code area for examination and recordation of damage by code area.

2. In a means for assessing damage to an automotive vehicle, a device comprising photographic views of the front, rear, sides and top of a damaged vehicle, gridworks of intersecting horizontal and vertical lines with code designations along the coordinates thereof, each gridwork being superimposed on each photograph and having code areas specially arranged for each photographic view, a base having a recess receiving one of said photographs, a pair of opaque transversely extending strips and a pair of opaque longitudinally extending strips slidably mounted on said base over said photograph, the inner edges of said strips being adapted to align with the horizontal and vertical lines of said gridwork to isolate each code area for examination and recordation of damage by code area.

3. An auto damage assessment device comprising a pictorial representation of a damaged vehicle with a gridwork of intersecting horizontal and vertical lines superimposed thereon providing code areas, a base supporting said representation and superimposed gridwork and means slidable on said base over said representation and gridwork to isolate each code area for damage viewing, said means including a pair of substantially opaque longitudinally extending strips slidable transversely on said base and a pair of substantially opaque transversely extending strips slidable longitudinally on said base, the inner edges of said strips being adapted to align selectively with the horizontal and vertical lines of said gridwork.

4. The combination of claim 3 wherein said pictorial representation is a photograph and said gridwork is superimposed thereon as an integral part thereof.

5. The combination of claim 3 wherein said base includes a rectangular recess receiving said pictorial representation and superimposed gridwork.

6. An auto damage assessment device comprising a pictorial representation of a damaged vehicle with a gridwork of intersecting horizontal and vertical lines superimposed thereon providing code areas, a base supporting said representation and superimposed gridwork and means movable over said base, said representation and gridwork selectively isolating each code area for damage examination.

7. The combination of claim 6 wherein said pictorial representation is a photograph and said gridwork is superimposed thereon as an integral part thereof.

References Cited in the file of this patent

UNITED STATES PATENTS

| | | |
|---|---|---|
| 1,524,164 | Bennet | Jan. 27, 1925 |
| 1,937,433 | Moe | Nov. 28, 1933 |

FOREIGN PATENTS

| | | |
|---|---|---|
| 5,915 of 1914 | Great Britain | Jan. 28, 1915 |
| 179,524 | Great Britain | Sept. 14, 1922 |
| 275,450 | Great Britain | Aug. 11, 1927 |